United States Patent
Uno

(10) Patent No.: US 9,996,180 B2
(45) Date of Patent: Jun. 12, 2018

(54) DETERMINING PROCESS TO BE EXECUTED BASED ON DIRECTION OF SURFACE IN WHICH VIBRATION-APPLIED SURFACE FACES AND APPLICATION STATE

(71) Applicant: NEC Corporation, Minato-ku, Tokyo (JP)

(72) Inventor: Masayuki Uno, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

(21) Appl. No.: 14/764,037

(22) PCT Filed: Jan. 27, 2014

(86) PCT No.: PCT/JP2014/051635
§ 371 (c)(1),
(2) Date: Jul. 28, 2015

(87) PCT Pub. No.: WO2014/125910
PCT Pub. Date: Aug. 21, 2014

(65) Prior Publication Data
US 2015/0355770 A1    Dec. 10, 2015

(30) Foreign Application Priority Data
Feb. 13, 2013  (JP) ................................. 2013-025901

(51) Int. Cl.
*H04M 1/00* (2006.01)
*H04B 1/38* (2015.01)
(Continued)

(52) U.S. Cl.
CPC .......... *G06F 3/0414* (2013.01); *G06F 1/1694* (2013.01); *G06F 3/017* (2013.01);
(Continued)

(58) Field of Classification Search
CPC ...... G06F 1/1694; G06F 3/017; G06F 3/0346; G06F 3/0414; G06F 3/165;
(Continued)

(56) References Cited

U.S. PATENT DOCUMENTS 8,181,874 B1 * 5/2012 Wan ................. H04M 1/72522
235/435
2005/0246109 A1  11/2005 Bang et al.
(Continued)

FOREIGN PATENT DOCUMENTS

CN       1694044 A     11/2005
CN       102246125     11/2011
(Continued)

OTHER PUBLICATIONS

Machine translation of Shibuya (Japanese Patent Application Publication No. 2008-176641 A1), published on Jul. 31, 2008.*
(Continued)

*Primary Examiner* — German Viana Di Prisco
*Assistant Examiner* — Mark G. Pannell

(57) ABSTRACT

An information processing apparatus (2000) includes a plurality of surfaces. A vibration detection unit (2020) detects a vibration applied to the information processing apparatus (2000). An operation surface detection unit (2040) detects an operation surface, which is a surface to which a vibration is applied, based on the vibration detected by the vibration detection unit (2020). An apparatus state detection unit (2060) detects a state of the information processing apparatus (2000). An application state detection unit (2080) detects a state of an application. A process determination unit (2100) determines a predetermined process to be executed, based on the operation surface detected by the operation surface detection unit (2040), the state of the information processing apparatus (2000) detected by the
(Continued)

| STATE OF APPLICATION<br>LOCATION | DURING INCOMING CALL | DURING RECEIVING CALL | DURING EXECUTION OF ANSWERING MACHINE FUNCTION |
|---|---|---|---|
| POSITION ON WHICH INTENSE LIGHT FALLS, AND WHICH IS AROUND PERSON | RESPOND IN NORMAL CALL MODE | CALL END | — |
| POSITION ON WHICH INTENSE LIGHT FALLS, AND WHICH IS NOT AROUND PERSON | RESPOND IN HANDS-FREE CALL MODE | CALL END | — |
| POSITION ON WHICH INTENSE LIGHT DOES NOT FALL, AND WHICH IS AROUND PERSON | RESPOND IN HANDS-FREE CALL MODE | CALL END | — |
| POSITION ON WHICH INTENSE LIGHT DOES NOT FALL, AND WHICH IS NOT AROUND PERSON | EXECUTE ANSWERING MACHINE FUNCTION | — | TERMINATE ANSWERING MACHINE FUNCTION | apparatus state detection unit (2060), and the state of the application detected by the application state detection unit (2080).

9 Claims, 14 Drawing Sheets

(51) Int. Cl.
*G06F 17/00* (2006.01)
*H03G 3/00* (2006.01)
*G06F 15/16* (2006.01)
*G06F 3/041* (2006.01)
*H04M 1/725* (2006.01)
*G06F 3/0346* (2013.01)
*G06F 3/16* (2006.01)
*G06F 1/16* (2006.01)
*G06F 3/01* (2006.01)

(52) U.S. Cl.
CPC ............ *G06F 3/0346* (2013.01); *G06F 3/165* (2013.01); *H04M 1/7253* (2013.01); *H04M 1/72519* (2013.01); *H04M 1/72569* (2013.01); *H04M 1/72597* (2013.01); *G06F 2200/1636* (2013.01); *G06F 2200/1638* (2013.01); *H04M 2250/12* (2013.01)

(58) Field of Classification Search
CPC .... G06F 2200/1636; G06F 2200/1638; H04M 1/72519; H04M 1/7253; H04M 1/72569; H04M 1/72597
USPC ......................................................... 455/566
See application file for complete search history.

(56) References Cited

U.S. PATENT DOCUMENTS

| | | | | |
|---|---|---|---|---|
| 2006/0217825 A1* | 9/2006 | Takeda | ................ | G01P 15/0891 700/90 |
| 2008/0137883 A1* | 6/2008 | Araki | .................... | H04M 1/605 381/107 |
| 2008/0184797 A1* | 8/2008 | Kawaguchi | .......... | G10H 1/0008 73/504.02 |
| 2009/0186654 A1* | 7/2009 | Chen | .................. | H04M 1/72522 455/556.1 |
| 2009/0262074 A1* | 10/2009 | Nasiri | ...................... | A63F 13/06 345/158 |
| 2009/0265671 A1 | 10/2009 | Sachs et al. | | |
| 2011/0102350 A1 | 5/2011 | Jung | | |
| 2011/0167383 A1* | 7/2011 | Schuller | ................ | G06F 9/4443 715/808 |
| 2012/0112930 A1* | 5/2012 | Ivanov | ...................... | G06F 3/01 341/20 |
| 2014/0081521 A1* | 3/2014 | Frojdh | ............. | H04N 21/42201 701/36 |
| 2014/0173051 A1* | 6/2014 | Sagayaraj | ............... | H04W 4/18 709/219 |

FOREIGN PATENT DOCUMENTS

| | | |
|---|---|---|
| EP | 1591873 A2 | 11/2005 |
| JP | 2006-252736 A | 9/2006 |
| JP | 2008-176641 A | 7/2008 |
| JP | 2009-033651 A | 2/2009 |
| JP | 2009-129248 A | 6/2009 |
| JP | 2010-213099 A | 9/2010 |
| WO | 2011/084956 A2 | 7/2011 |

OTHER PUBLICATIONS

International Search Report for PCT Application No. PCT/JP2014/051635, dated Apr. 1, 2014.
Extended European Search Report for EP Application No. EP14751434.3 dated Sep. 5, 2016.
Chinese Office Action for CN Application No. 201480008694.1 dated Mar. 2, 2017 with English Translation.
Japanese Office Action for JP Application No. 2015-500173 dated Jan. 23, 2018 with English Translation.

* cited by examiner

FIG. 6

| DIRECTION OF OPERATION SURFACE \ STATE OF APPLICATION | DURING MUSIC STOP | DURING MUSIC REPRODUCTION |
|---|---|---|
| +X | PLAY MUSIC | STOP MUSIC |
| −X | — | PERFORM CUEING |
| +Y | MOVE TO NEXT MUSIC | MOVE TO NEXT MUSIC |
| −Y | MOVE TO PRECEDING MUSIC | MOVE TO PRECEDING MUSIC |
| +Z | INCREASE VOLUME OF SOUND | INCREASE VOLUME OF SOUND |
| −Z | REDUCE VOLUME OF SOUND | REDUCE VOLUME OF SOUND |

FIG. 7

| DIRECTION OF OPERATION SURFACE / STATE OF APPLICATION | DURING CALL BEING INCOMING | DURING CALL BEING ESTABLISHED |
|---|---|---|
| +X | RESPOND TO INCOMING CALL | FINISH CALL |
| -X | REJECT INCOMING CALL | HOLD CALL |
| +Y | INCREASE VOLUME OF SOUND | INCREASE VOLUME OF SOUND |
| -Y | REDUCE VOLUME OF SOUND | REDUCE VOLUME OF SOUND |
| +Z | — | RESPOND TO ANOTHER INCOMING CALL |
| -Z | — | — |

FIG. 8

| STATE OF APPLICATION / LOCATION | DURING INCOMING CALL | DURING RECEIVING CALL | DURING EXECUTION OF ANSWERING MACHINE FUNCTION |
|---|---|---|---|
| POSITION ON WHICH INTENSE LIGHT FALLS, AND WHICH IS AROUND PERSON | RESPOND IN NORMAL CALL MODE | CALL END | — |
| POSITION ON WHICH INTENSE LIGHT FALLS, AND WHICH IS NOT AROUND PERSON | RESPOND IN HANDS-FREE CALL MODE | CALL END | — |
| POSITION ON WHICH INTENSE LIGHT DOES NOT FALL, AND WHICH IS AROUND PERSON | RESPOND IN HANDS-FREE CALL MODE | CALL END | — |
| POSITION ON WHICH INTENSE LIGHT DOES NOT FALL, AND WHICH IS NOT AROUND PERSON | EXECUTE ANSWERING MACHINE FUNCTION | — | TERMINATE ANSWERING MACHINE FUNCTION |

FIG. 13
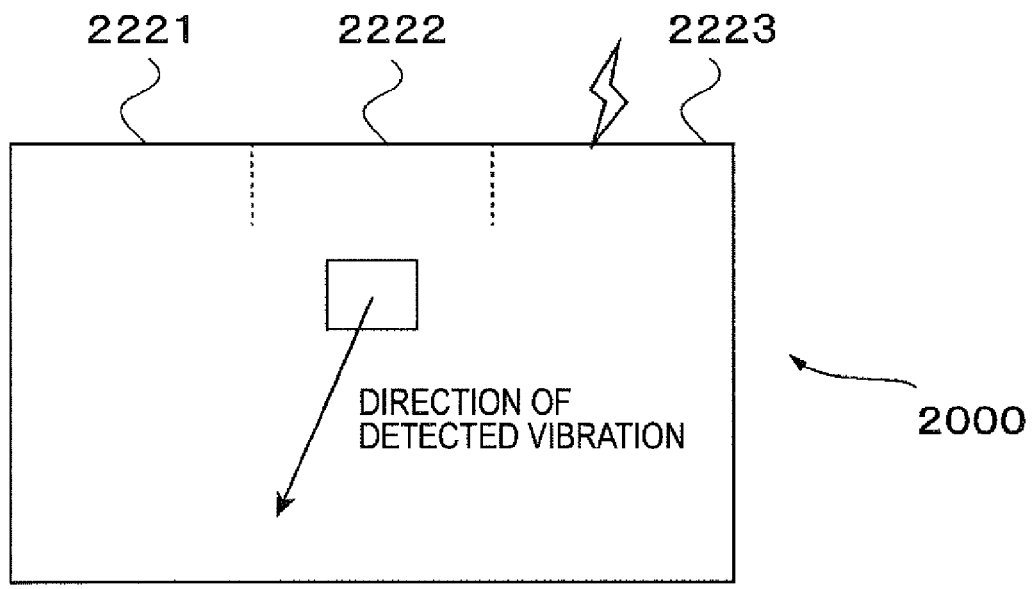
(a)
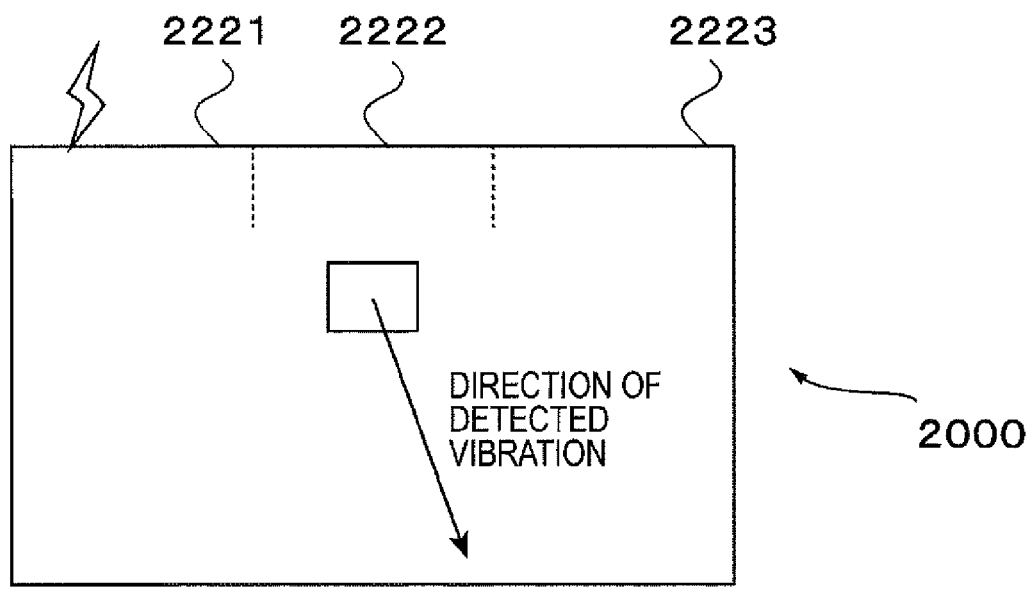
(b)

DETERMINING PROCESS TO BE EXECUTED BASED ON DIRECTION OF SURFACE IN WHICH VIBRATION-APPLIED SURFACE FACES AND APPLICATION STATE

This application is a National Stage Entry of PCT/JP2014/051635 filed on Jan. 27, 2014, which claims priority from Japanese Patent Application 2013-025901 filed on Feb. 13, 2013, the contents of all of which are incorporated herein by reference, in their entirety.

TECHNICAL FIELD

The present invention relates to an information processing apparatus, an information processing method, and an information processing program.

BACKGROUND ART

Small-sized information processing apparatuses such as a cellular phone, a smartphone, or a music player have been developed. Operations of these information processing apparatuses are typically performed using a keyboard, a touch panel or the like which is installed on a main body of an apparatus.

An operation method using a keyboard or a touch panel installed on a main body of an apparatus may be inconvenient for a user. For example, to operate a cellular phone in a pocket, it is necessary to take the cellular phone out of the pocket. Further, an operation of taking a cellular phone out of a pocket and operating the cellular phone, for example, in busy traffic may be dangerous.

Thus, a technique for facilitating the operation of a small-sized information processing apparatus has been developed. There are Patent Documents 1 and 2 that discloses such techniques. Both apparatuses disclosed in the following related documents execute a predetermined process when the apparatuses are tapped by a user.

A music player disclosed in Patent Document 1 executes a predetermined process when a headphone is tapped. Specifically, when a headphone is tapped by a user, this music player determines three of 1) the state of the music player, 2) a region in which the headphone is tapped, and 3) the number of times the headphone is tapped. Such a music player determines a process to be executed, based on the results of the three determinations. For example, when the headphone is tapped one time during music is played, the music player performs a process of stopping the reproduction of music. In addition, when the headphone is tapped one time when music is stopped, the music player performs a process of starting the reproduction of music.

A portable electronic apparatus disclosed in Patent Document 2 displays information using a display unit provided on a surface which is tapped by a user.

RELATED DOCUMENTS

Patent Documents

[Patent Document 1] Japanese Unexamined Patent Application Publication No. 2010-213099

[Patent Document 2] Japanese Unexamined Patent Application Publication No. 2009-33651

SUMMARY OF THE INVENTION

The inventor has examined a method of providing a greater diversity of operation methods, in an information processing apparatus that executes a predetermined process when a vibration is applied by a user. Specifically, the inventor has examined a method of determining a predetermined process to be executed, in further consideration of the state of the information processing apparatus, in the information processing apparatus that executes a predetermined process when a vibration is applied by a user. In both the apparatuses disclosed in the above-mentioned patent documents, the state of the apparatus is not considered when the predetermined process to be executed is determined.

The present invention is contrived in view of the above problems. An object of the present invention is to provide a technique that makes it possible to perform intuitive and diverse operations of an information processing apparatus.

According to the present invention, there is provided an information processing apparatus having a plurality of surfaces and executing an application, including: a vibration detection unit detecting a vibration which is applied to the information processing apparatus; an operation surface detection unit detecting an operation surface among the plurality of surfaces based on the vibration detected by the vibration detection unit, the operation surface being a surface to which a vibration is applied; an apparatus state detection unit detecting a state of the information processing apparatus; an application state detection unit detecting a state of the application; and a process determination unit determining a predetermined process to be executed, from a plurality of predetermined processes, based on the state of the application, the state of the information processing apparatus, and the operation surface.

According to the present invention, there is provided an information processing program that controls a computer, having a plurality of surfaces, which executes an application. The information processing program causes the computer to realize a function of each functional configuration unit included in the information processing apparatus provided in the present invention.

According to the present invention, there is provided an information processing method which is executed by a computer having a plurality of surfaces and executing an application. The information processing method includes: a vibration detection step of detecting a vibration which is applied to the computer; an operation surface detection step of detecting an operation surface among the plurality of surfaces based on the vibration detected by the vibration detection step, the operation surface being a surface to which a vibration is applied; an apparatus state detection step of detecting a state of the computer; an application state detection step of detecting a state of the application; and a process determination step of determining a predetermined process to be executed, from a plurality of predetermined processes, based on the state of the application, the state of the computer, and the operation surface.

According to the present invention, a technique that makes it possible to perform intuitive and diverse operations of an information processing apparatus is provided.

BRIEF DESCRIPTION OF THE DRAWINGS

The above-mentioned objects, other objects, features and advantages will be made clearer from the preferred exemplary embodiments described below, and the following accompanying drawings.

FIG. 6 is a diagram illustrating a method of operating the information processing apparatus according to Example 1.

FIG. 7 is a diagram illustrating a method of operating an information processing apparatus according to Example 2.

FIG. 8 is a diagram illustrating a method of operating an information processing apparatus according to Example 3.

FIG. 13 is a diagram illustrating a difference in vibration direction due to a difference in operation region.

DESCRIPTION OF EXEMPLARY EMBODIMENTS

Hereinafter, exemplary embodiments of the present invention will be described with reference to the accompanying drawings. In addition, in block diagrams, arrows show a flow of information. Further, in the block diagrams, each block represents a function-based configuration rather than a hardware-based configuration.

Exemplary Embodiment 1

Figure 1:
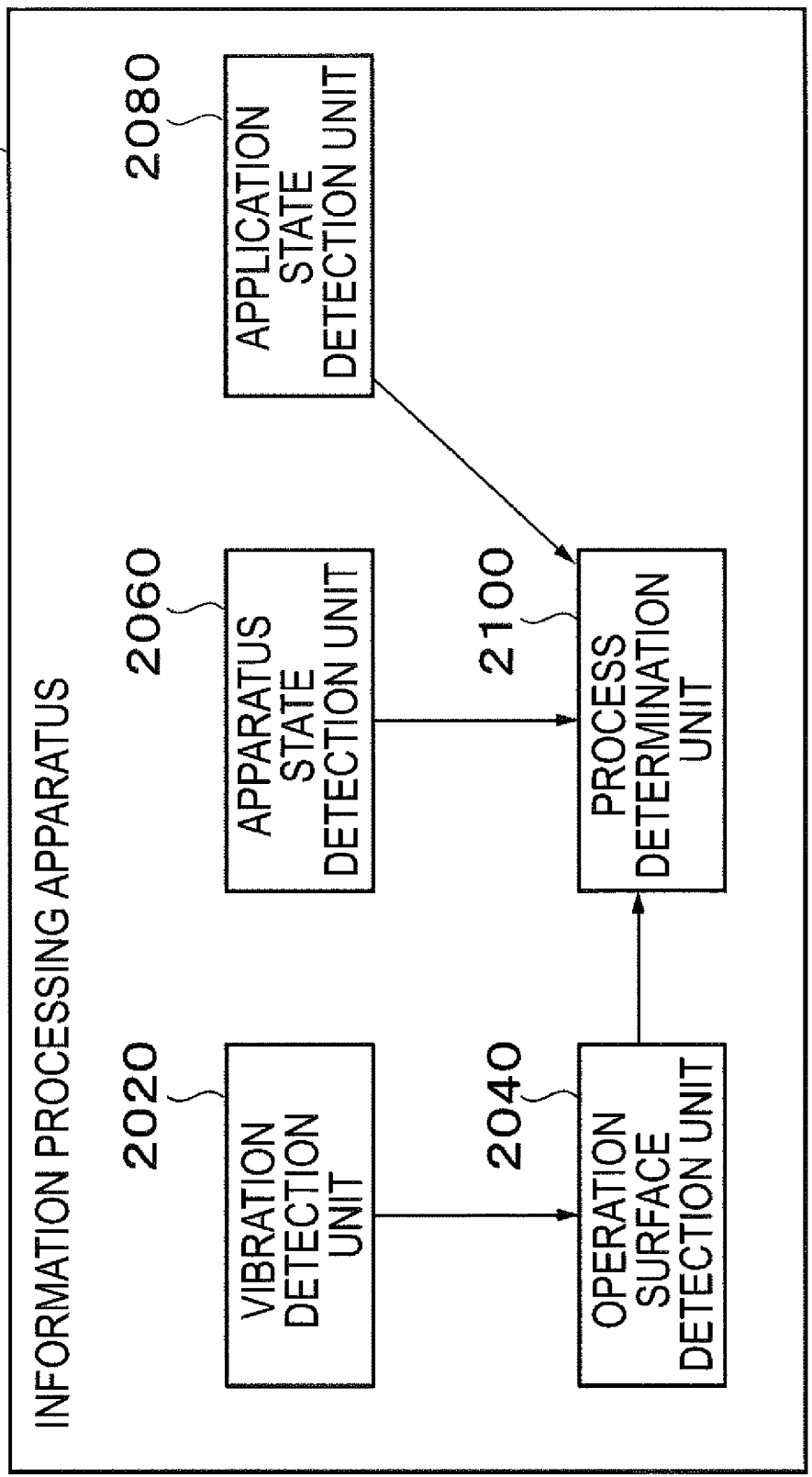
FIG. 1 is a block diagram illustrating an information processing apparatus according to Exemplary Embodiment 1.

FIG. 1 is a block diagram illustrating an information processing apparatus 2000 according to Exemplary Embodiment 1.

Figure 2:
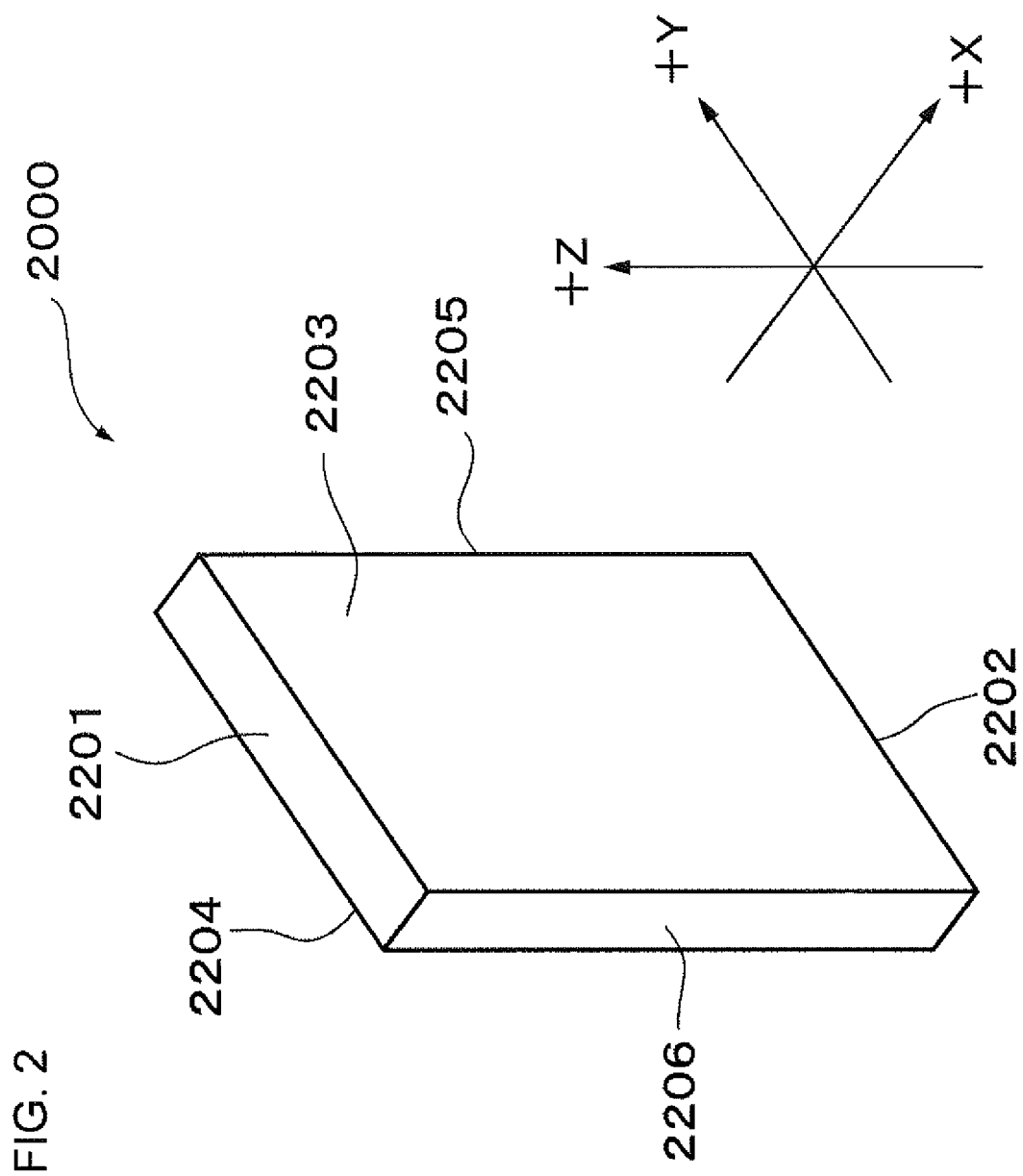
FIG. 2 is a diagram illustrating surfaces of the information processing apparatus.

The information processing apparatus 2000 has a plurality of surfaces. FIG. 2 is a diagram illustrating surfaces of the information processing apparatus 2000. In FIG. 2, the information processing apparatus 2000 has six surfaces 2201 to 2206.

The information processing apparatus 2000 executes various applications. The applications executed by the information processing apparatus 2000 are, for example, an application for executing a voice call (hereinafter, call application), an application for playing or recording music (hereinafter, music application), and the like.

The information processing apparatus 2000 determines a predetermined process to be executed, from a plurality of predetermined processes based on the following three indexes. A first index is a surface to which a vibration is applied, among the surfaces of the information processing apparatus 2000. Hereinafter, the surface to which a vibration is applied is denoted by an operation surface. A second index is a state of the information processing apparatus 2000. A third index is a state of an application. Hereinafter, functions of the information processing apparatus 2000 will be described in detail.

<Vibration Detection Unit 2020>

The information processing apparatus 2000 includes a vibration detection unit 2020. The vibration detection unit 2020 detects a vibration applied to the information processing apparatus 2000. The vibration detection unit 2020 detects a vibration, for example, using a vibration sensor or an acceleration sensor.

<Operation Surface Detection Unit 2040>

The information processing apparatus 2000 includes an operation surface detection unit 2040. The operation surface detection unit 2040 detects an operation surface based on the vibration that the vibration detection unit 2020 detects. For example, when the vibration detection unit 2020 detects a vibration using a 3-axis acceleration sensor, the operation surface detection unit 2040 detects a surface to which a vibration is applied, based on the proportion of acceleration measured with respect to each of three axes.

<Apparatus State Detection Unit 2060>

The information processing apparatus 2000 includes an apparatus state detection unit 2060. The apparatus state detection unit 2060 detects a state of the information processing apparatus 2000. The state of the information processing apparatus 2000 is, for example, a posture of the information processing apparatus 2000. The posture of the information processing apparatus 2000 is represented by, for example, a direction to which each surface of the information processing apparatus 2000 is directed.

The posture of the information processing apparatus 2000 will be described with reference to FIGS. 2 and 3. The information processing apparatus 2000 in FIG. 2 is in a posture of that the surface 2201 is directed to a +Z direction, and the surface 2202 is directed to a −Z direction. Meanwhile, the information processing apparatus 2000 in FIG. 2 is in a posture of that the surface 2203 is directed to a +X direction, and the surface 2204 is directed to a −X direction. Further, the information processing apparatus 2000 in FIG. 2 is in a posture of that the surface 2205 is directed to a +Y direction, and the surface 2206 is directed to a −Y direction.

Figure 3:
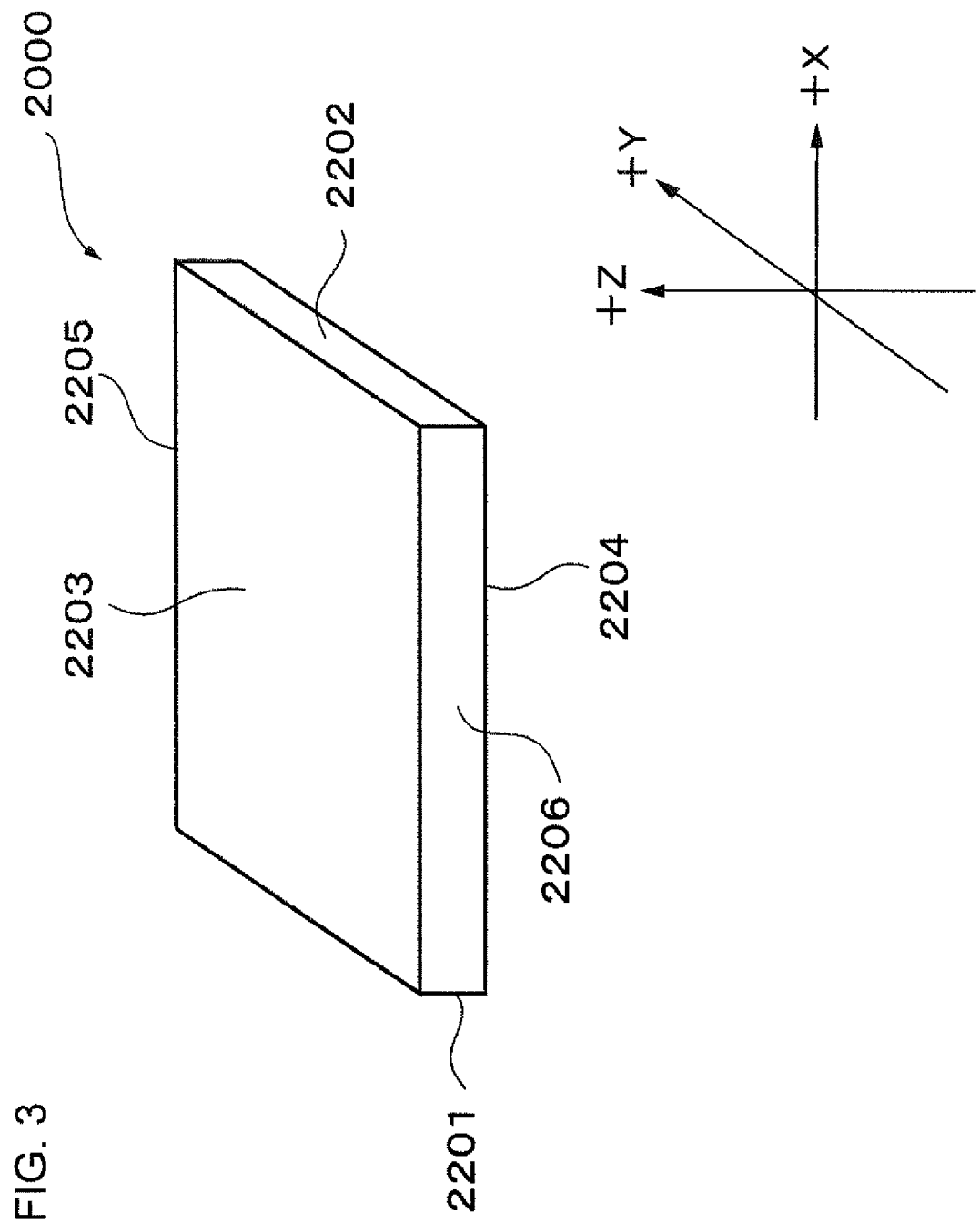
FIG. 3 is a diagram illustrating a posture of the information processing apparatus.

On the other hand, the information processing apparatus 2000 in FIG. 3 is in a posture of that the surface 2201 is directed to the −X direction, and the surface 2202 is directed to the +X direction. Meanwhile, the information processing apparatus 2000 in FIG. 3 is in a posture of that the surface 2203 is directed to the +Z direction, and the surface 2204 is directed to the −Z direction. Further, the information processing apparatus 2000 in FIG. 3 is in a posture of that the surface 2205 is directed to the +Y direction, and the surface 2206 is directed to the −Y direction.

The information processing apparatus 2000 can detect which surface being directed to which direction has a vibration applied thereto, based on the operation surface and the posture of the information processing apparatus 2000. Suppose that the posture of the information processing apparatus 2000 is a posture shown in FIG. 2. Then, suppose that a vibration is applied to the surface 2201. In this case, the information processing apparatus 2000 detects that the surface 2201 is an operation surface through the operation surface detection unit 2040. In addition, the information processing apparatus 2000 detects that the posture of the information processing apparatus 2000 is a posture shown in FIG. 2 through the apparatus state detection unit 2060. As a result, the information processing apparatus 2000 detects that a surface having a vibration applied thereto is a surface being directed to the +Z direction.

The apparatus state detection unit 2060 detects the posture of the information processing apparatus 2000, for example, using an acceleration sensor or the like. Here, when the vibration detection unit 2020 also uses a similar sensor, the vibration detection unit 2020 and the apparatus state detection unit 2060 may share the same sensor, and may use separate sensors, respectively.

Besides, for example, the state of the information processing apparatus 2000 is the location of the information processing apparatus 2000. For example, the apparatus state detection unit 2060 detects whether or not the location of the information processing apparatus 2000 is a place in which light shining on the information processing apparatus 2000 has a predetermined intensity or greater.

When the location of the information processing apparatus 2000 is a place in which light shining on the information processing apparatus 2000 has a predetermined intensity or greater, for example, the information processing apparatus 2000 is held by a user's hand, or is placed on a desk. On the other hand, when the location of the information processing apparatus 2000 is a place in which light shining on the information processing apparatus 2000 does not have a predetermined intensity or greater, for example, the information processing apparatus 2000 is located inside a pocket of a user's clothes.

The apparatus state detection unit 2060 detects the location of the information processing apparatus 2000, for example, using an optical sensor. The apparatus state detection unit 2060 determines whether or not the intensity of light detected by an optical sensor is equal to or greater than a predetermined intensity.

Besides, for example, the apparatus state detection unit 2060 may detect the location of the information processing apparatus 2000 based on the temperature of the information processing apparatus 2000. For example, when the temperature of the information processing apparatus 2000 is close to the human body temperature, it can be determined that the location of the information processing apparatus 2000 is around a person (such as inside a chest pocket). In this manner, the apparatus state detection unit 2060 determines whether or not the information processing apparatus 2000 is located around a user based on the temperature of the information processing apparatus 2000.

The apparatus state detection unit 2060 detects the temperature of the information processing apparatus 2000, for example, using a temperature sensor.

Besides, for example, the apparatus state detection unit 2060 may detect a human pulse, cardiac sound or the like, and thereby detect whether or not the location of the information processing apparatus 2000 is a position around a person. The apparatus state detection unit 2060 detects a human pulse, cardiac sound or the like, for example, using a vibration sensor or an acceleration sensor. In this case, the apparatus state detection unit 2060 may also share a sensor with the vibration detection unit 2020, or may use a sensor different from a sensor used by the vibration detection unit 2020.

Further, for example, the apparatus state detection unit 2060 may detect a combination of the posture of the information processing apparatus 2000 and the location of the information processing apparatus 2000, as the state of the information processing apparatus 2000. In addition, for example, the apparatus state detection unit 2060 may detect, as a location of the information processing apparatus, a combination of "whether the location is a position in which light has a predetermined intensity or greater" and "whether the location is a position around a person".

<Application State Detection Unit 2080>

The information processing apparatus 2000 includes an application state detection unit 2080. The application state detection unit 2080 detects the state of an application.

There are various states of the application that the application state detection unit 2080 detects. For example, when the information processing apparatus 2000 executes a music application, the application state detection unit 2080 detects a state in which a music is played or a state in which a music is stopped, as the state of the application. Besides, for example, when the information processing apparatus 2000 executes a voice call application, the application state detection unit 2080 detects a state in which a call is incoming or a state in which a call is established, as the state of the application.

<Process Determination Unit 2100>

The information processing apparatus 2000 includes a process determination unit 2100. The process determination unit 2100 determines a predetermined process to be executed, based on the operation surface that the operation surface detection unit 2040 detects, the state of the information processing apparatus 2000 that the apparatus state detection unit 2060 detects, and the state of the application the application state detection unit 2080 detects.

In this manner, the information processing apparatus 2000 of Exemplary Embodiment 1 determines a predetermined process to be executed, in consideration of the state of the information processing apparatus 2000, in addition to the state of the application and the operation surface. Therefore, according to information processing apparatus 2000 of Exemplary Embodiment 1, it is possible to provide a greater diversity of operation methods than in a case where a process to be executed is determined without considering the state of the information processing apparatus 2000.

<Hardware Configuration>

Figure 4:
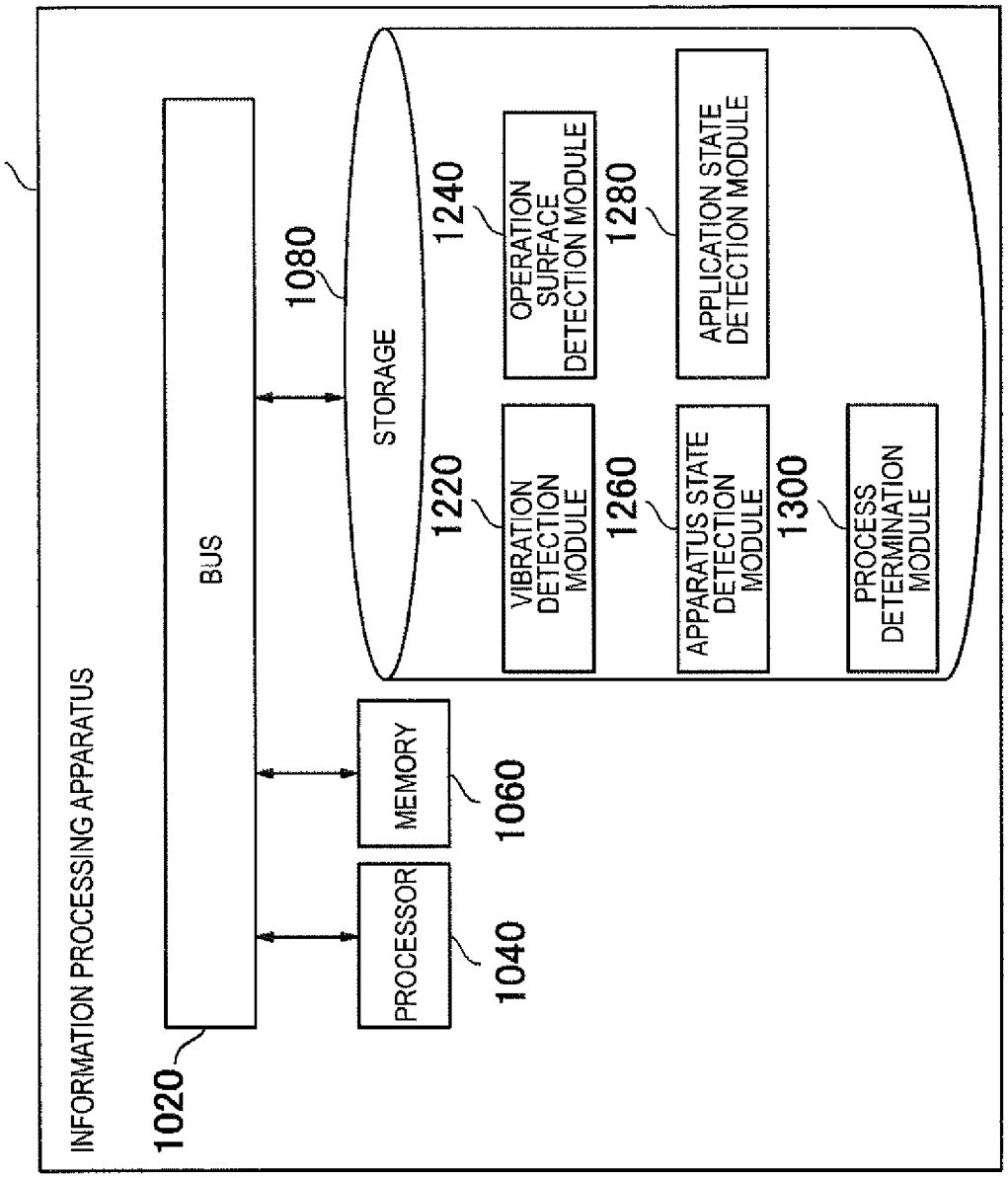
FIG. 4 is a block diagram illustrating a hardware configuration of the information processing apparatus.

FIG. 4 is a block diagram illustrating a hardware configuration of the information processing apparatus 2000. In FIG. 4, the information processing apparatus 2000 includes a bus 1020, a processor 1040, a memory 1060, and a storage 1080. However, the hardware configuration of the information processing apparatus 2000 is not limited to the configuration shown in FIG. 4.

The bus 1020 is a transmission path for the processor 1040, the memory 1060, and the storage 1080 to mutually transmit and receive information. The processor 1040 is, for example, an arithmetic processing unit such as a CPU (Central Processing Unit) or a GPU (Graphics Processing Unit). The memory 1060 is a memory such as a RAM (Random Access Memory) or a ROM (Read Only Memory). The storage 1080 is, for example, a storage apparatus such as a hard disk, a USB (Universal Serial Bus) memory, or an SSD (Solid State Drive). In addition, the storage 1080 may be a memory such as a RAM or a ROM.

A vibration detection module 1220 is a program for causing the information processing apparatus 2000 to have a function of the vibration detection unit 2020. The processor 1040 executes the vibration detection module 1220 to thereby realize the function of the vibration detection unit 2020.

An operation surface detection module 1240 is a program for causing the information processing apparatus 2000 to have a function of the operation surface detection unit 2040. The processor 1040 executes the operation surface detection module 1240 to thereby realize the function of the operation surface detection unit 2040.

An apparatus state detection module 1260 is a program for causing the information processing apparatus 2000 to have a function of the apparatus state detection unit 2060. The processor 1040 executes the apparatus state detection module 1260 to thereby realize the function of the apparatus state detection unit 2060.

An application state detection module 1280 is a program for causing the information processing apparatus 2000 to have a function of the application state detection unit 2080. The processor 1040 executes the application state detection module 1280 to thereby realize the function of the application state detection unit 2080.

A process determination module 1300 is a program for causing the information processing apparatus 2000 to have a function of the process determination unit 2100. The processor 1040 executes the process determination module 1300 to thereby realize the function of the process determination unit 2100.

The vibration detection module 1220, the operation surface detection module 1240, the apparatus state detection module 1260, the application state detection module 1280, and the process determination module 1300 are stored in, for example, the storage 1080. Each of the modules is read out into, for example, the memory 1060 by the processor 1040. Here, each of the modules may be stored in the memory 1060.

<Flow of Processes>

Figure 5:
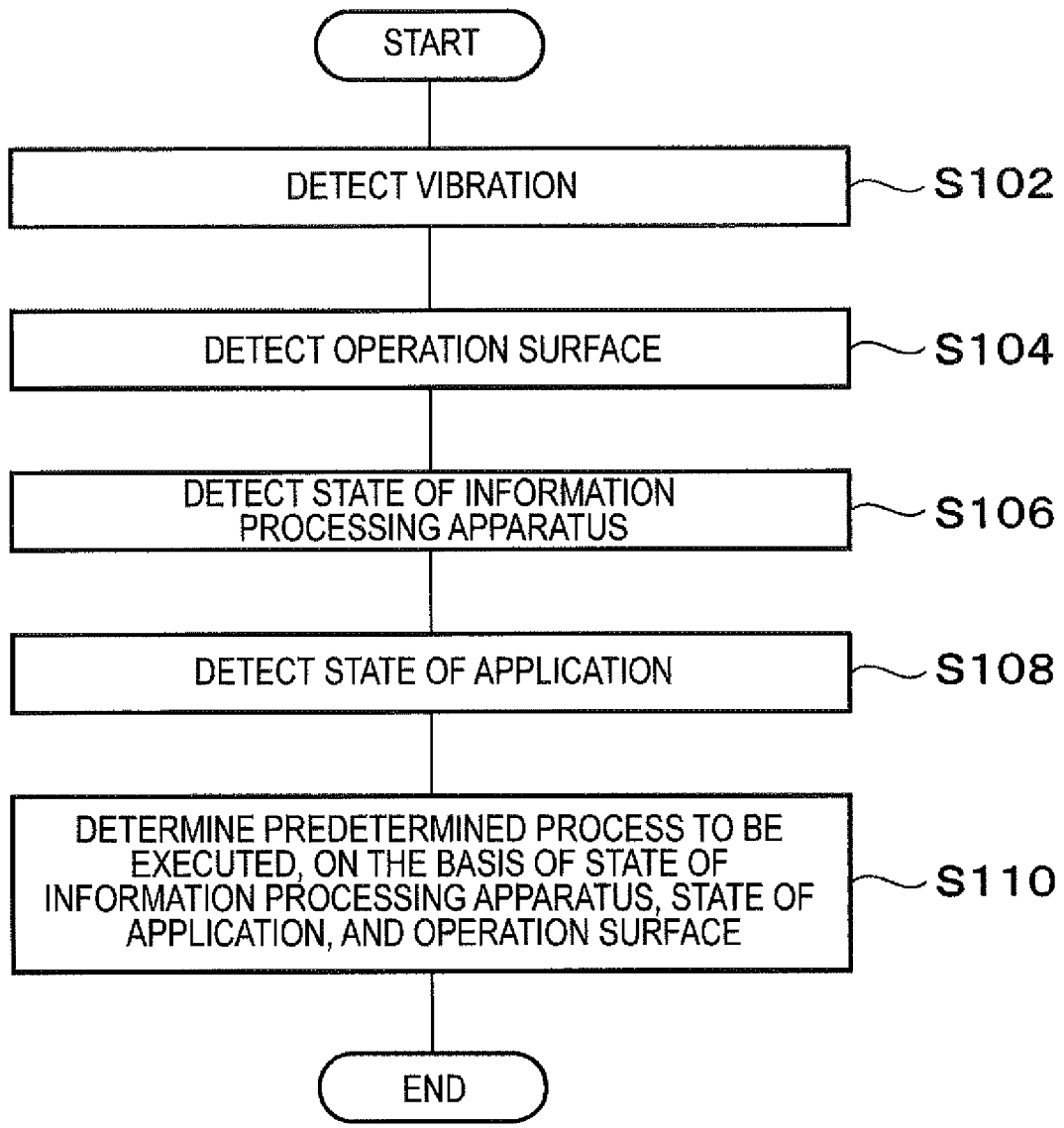
FIG. 5 is a flow diagram illustrating a flow of processes performed by the information processing apparatus according to Exemplary Embodiment 1.

FIG. 5 is a flow diagram illustrating a flow of processes performed by the information processing apparatus 2000 according to Exemplary Embodiment 1. In step S102, the vibration detection unit 2020 detects a vibration applied to the information processing apparatus 2000. In step S104, the operation surface detection unit 2040 detects an operation surface based on the vibration that the vibration detection unit 2020 detects. In step S106, the apparatus state detection unit 2060 detects the state of the information processing apparatus 2000. In step S108, the application state detection unit 2080 detects the state of the application. In step S110, the process determination unit 2100 determines a predetermined process to be executed, based on the state of the information processing apparatus 2000, the state of the application, and the operation surface.

<Detailed Description>

Hereinafter, the information processing apparatus 2000 of Exemplary Embodiment 1 will be described in detail.

<Example of Predetermined Process>

There are various predetermined processes that the information processing apparatus 2000 executes. For example, the predetermined processes include a process of starting the operation of the application, a process of terminating the operation of the application, a process of stopping the operation of the application, or a process of restarting the operation of the application.

Further, for example, the predetermined process is a process of changing contents to be processed by an application. For example, in a case of a music application, the process of changing contents to be processed is a process of changing a music content to be played.

Further, for example, the predetermined process includes a process of changing a processing position of contents processed by an application. For example, in case of a music application, the process of changing the processing position of contents processed by an application is a process of changing a reproduction position of a music content (such as cueing, fast forwarding, or rewinding).

Further, for example, the predetermined process includes a process of increasing the volume of the sound to be output, a process of reducing the volume of the sound to be output, a process of increasing the volume of sound to be acquired, or a process of reducing the volume to be acquired. Further, for example, the predetermined process includes a process of enabling a sound output, a process of disabling a sound output, a process of enabling sound acquisition, or a process of disabling sound acquisition.

Further, for example, the predetermined process includes a process of changing the state of a voice call from a state in which the call is incoming to a state in which the call is established, a process of changing the state of a voice call from a state in which the call is established to a state in which the call is finished, or a process of changing the state of a voice call from a state in which the call is established to a state in which the call is held. Further, for example, the predetermined process includes a process of stopping output of a ring tone while maintaining the state of a voice call to a state in which a call is incoming.

EXAMPLE 1

A specific operation method of the information processing apparatus 2000 is shown as Example 1. The information processing apparatus 2000 of Example 1 executes a music application. In addition, the apparatus state detection unit 2060 of Example 1 detects the direction of each surface, as the state of the information processing apparatus 2000.

FIG. 6 is a diagram illustrating an operation method provided by the information processing apparatus 2000 of Example 1. A user can make a music being played by tapping a surface in the +X direction when music is stopped. In addition, a user can change the music being played to the next music by tapping a surface in the +Y direction during music reproduction. Further, a user can stop music by tapping the surface in the +X direction during music reproduction.

EXAMPLE 2

Further, another example of a method of operating the information processing apparatus 2000 is shown as Example 2. The information processing apparatus 2000 of Example 2 executes a voice call application. In addition, the apparatus state detection unit 2060 of Example 2 detects the direction of each surface as the state of the information processing apparatus 2000.

FIG. 7 is a diagram illustrating an operation method provided by the information processing apparatus 2000 of Example 2. For example, a user can respond to an incoming call by tapping the surface in the +X direction during the call being incoming. In addition, a user can reject an incoming call by tapping a surface in the −X direction during the call being incoming. In addition, a user can increase the sound volume by tapping the surface in the +Y direction during a call. Further, a user can respond to another incoming call by tapping a surface in the +Z direction during a call.

EXAMPLE 3

Further, another example of the method of operating the information processing apparatus 2000 is shown as Example 3. The information processing apparatus 2000 of Example 3 executes a voice call application. In addition, the apparatus state detection unit 2060 of Example 3 detects the location of the information processing apparatus 2000 as the state of the information processing apparatus 2000. Specifically, the apparatus state detection unit 2060 detects, as a location of the information processing apparatus 2000, a combination of "whether it is a position on which intense light falls" and "whether it is around a person".

FIG. 8 is a diagram illustrating functions that the information processing apparatus 2000 of Example 3 provides. Here, FIG. 8 shows, as an example, a case where the operation surface detected by the operation surface detection unit 2040 is a surface 2003 in FIG. 2. In case where there is an incoming call when the location of the information processing apparatus 2000 is in a position "on which intense light falls, and which is around a person", a user can respond to the incoming call in a normal call mode by tapping the surface 2003. Here, the position "on which intense light falls, and which is around a person" is, for example, the inside of a user's hand.

In addition, in a case where there is an incoming call when the location of the information processing apparatus 2000 is a position "on which intense light falls, and which is not around a person", a user can respond to the incoming call in a hands-free call mode by tapping the surface 2003. Here, the position "on which intense light falls, and which is not around a person" is, for example, on a desk.

In addition, in a case where there is an incoming call when the location of the information processing apparatus 2000 is a position "on which intense light does not fall, and which is around a person", a user can respond to the incoming call in a hands-free call mode by tapping the surface 2003. Here, the position "on which intense light does not fall, and which is around a person" is, for example, the inside of a pocket of a user's clothes.

In addition, in a case where there is an incoming call when the location of the information processing apparatus 2000 is a position "on which intense light does not fall, and which is around a person", a user can execute an answering machine function by tapping the surface 2003. Here, the position "on which intense light does not fall, and which is not around a person" is, for example, the inside of a user's bag.

<Other Applications>

Besides, for example, the information processing apparatus 2000 of Exemplary Embodiment 1 can perform switching to a silent mode, switching to a camera mode, or the like by each surface being tapped.

<Operational Effect>

With the above configuration, the information processing apparatus 2000 of Exemplary Embodiment 1 determines a predetermined process to be executed, in consideration of the state of the information processing apparatus 2000, in addition to the state of the application and the operation surface. Therefore, according to the information processing apparatus 2000 of Exemplary Embodiment 1, it is possible to provide a greater diversity of operation methods than in a case where a process to be executed is determined without considering the state of the apparatus.

Further, according to the information processing apparatus 2000, it is possible to provide a more intuitive operation by considering the state of the information processing apparatus 2000. For example, when the information processing apparatus 2000 considers the posture of the information processing apparatus 2000, the information processing apparatus 2000 determines a process to be executed, depending on "from which direction a vibration is applied". Therefore, even though a user holds the information processing apparatus 2000 in any kind of posture, the application of a vibration to the information processing apparatus 2000 from the same direction can cause the information processing apparatus 2000 to execute the same process. Thereby, a user can use the information processing apparatus 2000 more intuitively.

In addition, it is considered that a user wants to make the information processing apparatus 2000 perform different operations in accordance with the location of the information processing apparatus 2000. For example, when a user takes the information processing apparatus 2000 placed in a pocket out of the pocket, it is considered that the information processing apparatus 2000 has been taken out of the pocket because the user wants to make the information processing apparatus 2000 perform a different process from that performed when the apparatus is kept in the pocket. Thus, for example, a predetermined process executed by the information processing apparatus 2000 is changed in accordance with the location of the information processing apparatus 2000, and therefore a user can operate the information processing apparatus 2000 more intuitively.

A specific situation in which the information processing apparatus 2000 is used includes a case of listening to music through the information processing apparatus 2000 worn on the arm using an armband during running. Generally, it is considered that viewing a screen during running is troublesome. In addition, glancing sideways while running disables a user to recognize other passing persons, bicycles, automobiles and the like. For this reason, it is considered that the operation of an apparatus while viewing a display or a keyboard is dangerous.

When a music application is executed using the information processing apparatus 2000 of Exemplary Embodiment 1, intuitive and diverse operations can be performed, for example, as mentioned in FIG. 6. Thereby, a running user can operate a music application without feeling troublesome and without glancing sideways.

Besides, for example, as a specific situation in which the information processing apparatus 2000 is used, it is considered in which a user working in a warehouse responds to an incoming call of a voice call with respect to the information processing apparatus 2000 in a chest pocket. Generally, a user often has gloves on when working in a warehouse. For this reason, a user has difficulty in performing manipulations requiring a delicate operation, such as key input. In addition, since the fingertips tend to become dirty during work in a warehouse, it is considered that a user would dislike operating the information processing apparatus 2000 with his/her fingers.

An application of a voice call is executed using the information processing apparatus 2000 of Exemplary Embodiment 1, thereby allowing intuitive and diverse operations to be performed, for example, as mentioned in FIG. 7. For example, such operations are also easily performed with using a first or the like, not using the fingers. Therefore, a user can operate an application of a voice call without performing a delicate operation and without making the information processing apparatus 2000 dirty.

Exemplary Embodiment 2

Figure 9:
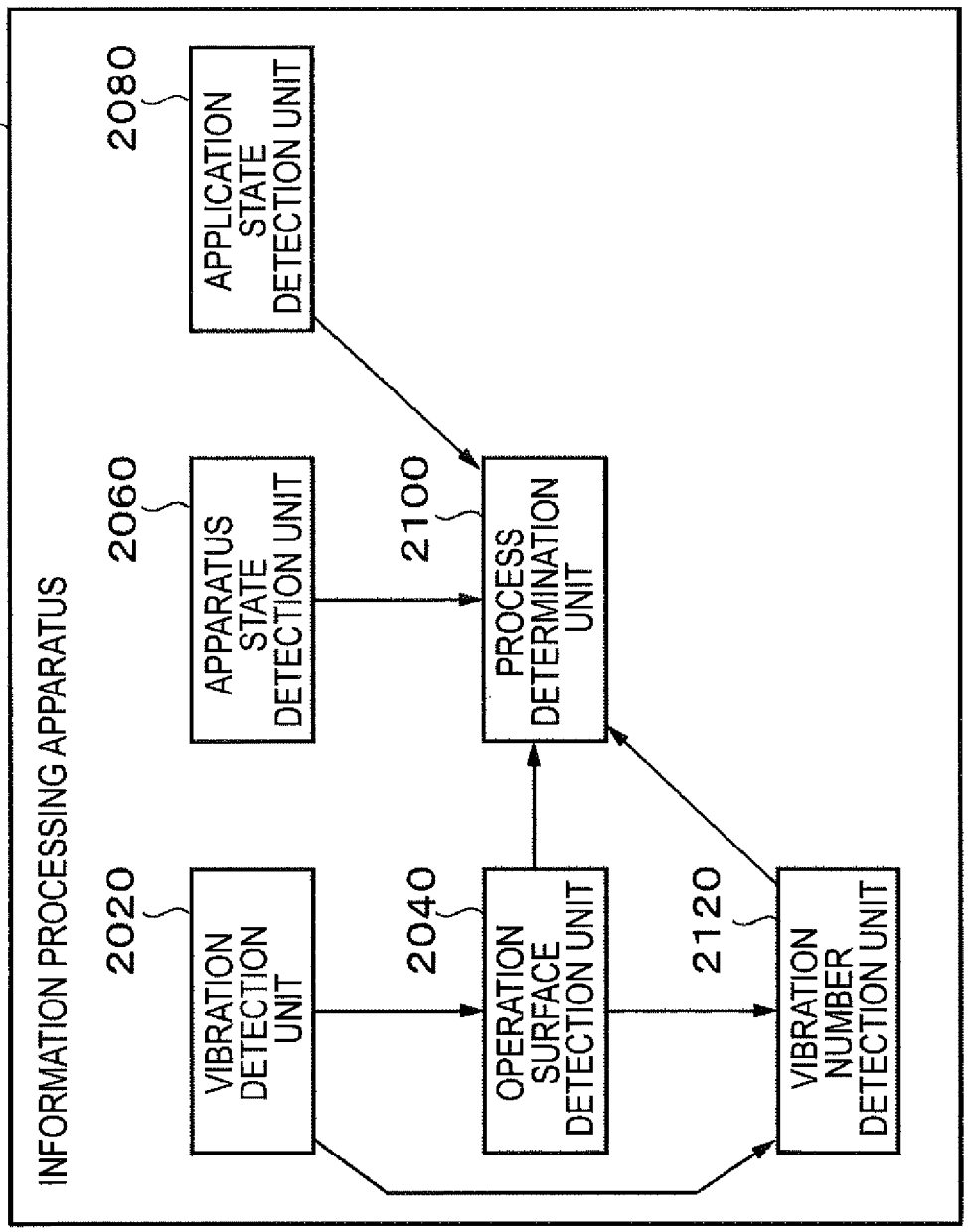
FIG. 9 is a block diagram illustrating an information processing apparatus according to Exemplary Embodiment 2.

FIG. 9 is a block diagram illustrating an information processing apparatus 2000 according to Exemplary Embodiment 2.

The information processing apparatus 2000 of Exemplary Embodiment 2 determines a predetermined process to be executed, in further consideration of the number of times a vibration is applied to the information processing apparatus 2000.

<Vibration Number Detection Unit 2120>

The information processing apparatus 2000 includes a vibration number detection unit 2120. The vibration number detection unit 2120 detects the number of vibration (hereinafter, the vibration number) which are applied to the information processing apparatus 2000, based on the vibration detected by the vibration detection unit 2020.

For example, the vibration number detection unit 2120 handles, as a vibration number, the number of vibrations that the vibration detection unit 2020 detects within a predetermined time. Besides, for example, the vibration number detection unit 2120 handles, as a vibration number, the number of vibrations continuously applied to the same surface among the surfaces of the information processing apparatus 2000. For example, as shown in FIG. 2, the information processing apparatus 2000 has surfaces 2201 to 2206. A vibration is applied to the information processing apparatus 2000 in order of the surface 2201, the surface 2201, and the surface 2202. In this case, the vibration number detection unit 2120 detects that the number of vibrations applied to the surface 2201 is two. Subsequently, suppose that a vibration is applied to the surface 2203. In this case, the vibration number detection unit 2120 detects that the number of vibrations applied to the surface 2202 is one.

<Process Determination Unit 2100>

The process determination unit 2100 determines a predetermined process to be executed, from a plurality of predetermined processes, based on the state of the information processing apparatus 2000, the state of the application, the operation surface, and the number of vibrations applied to the operation surface.

<Flow of Processes>

Figure 10:
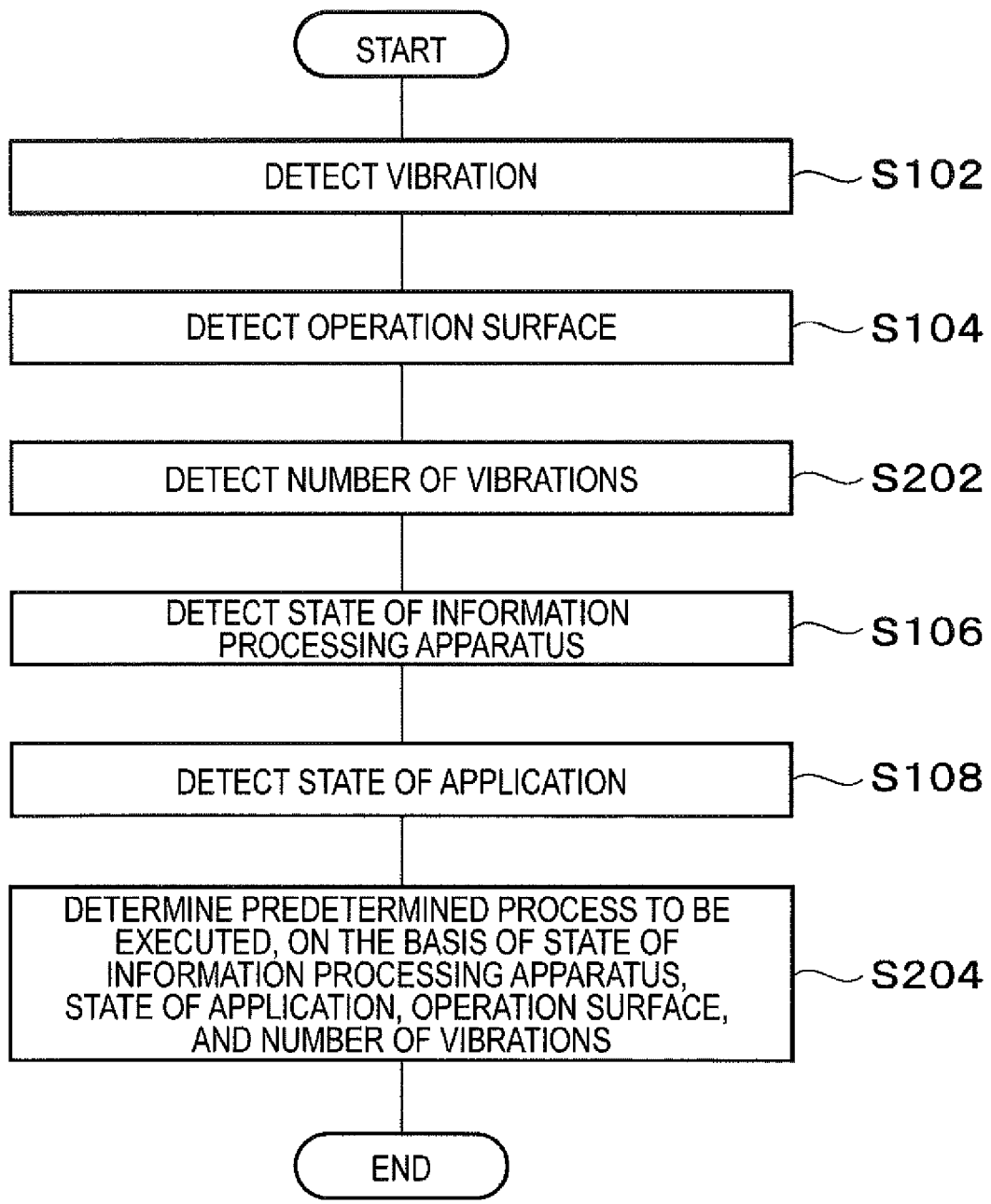
FIG. 10 is a flow diagram illustrating a flow of processes performed by the information processing apparatus according to Exemplary Embodiment 2.

FIG. 10 is a flow diagram illustrating a flow of processes executed by the information processing apparatus 2000 according to Exemplary Embodiment 2. In FIG. 10, processes of steps S102 to S108 are the same as the processes shown in the flow diagram of FIG. 5.

In step S202, the vibration number detection unit 2120 detects the number of vibrations applied to the operation surface. In step S204, the process determination unit 2100 determines a predetermined process to be executed, based on the state of the information processing apparatus 2000, the state of the application, the operation surface, and the number of vibrations applied to the operation surface.

<Operational Effect>

According to the information processing apparatus 2000 of Exemplary Embodiment 2, a predetermined process to be executed is determined from a plurality of predetermined processes, in further consideration of the number of vibrations applied to the operation surface, in addition to the state of the information processing apparatus 2000, the state of the application, and the operation surface. Therefore, according to the information processing apparatus 2000 of Exemplary Embodiment 2, it is possible to provide a greater diversity of operation methods than those of the information processing apparatus 2000 of Exemplary Embodiment 1.

Exemplary Embodiment 3

Figure 11:
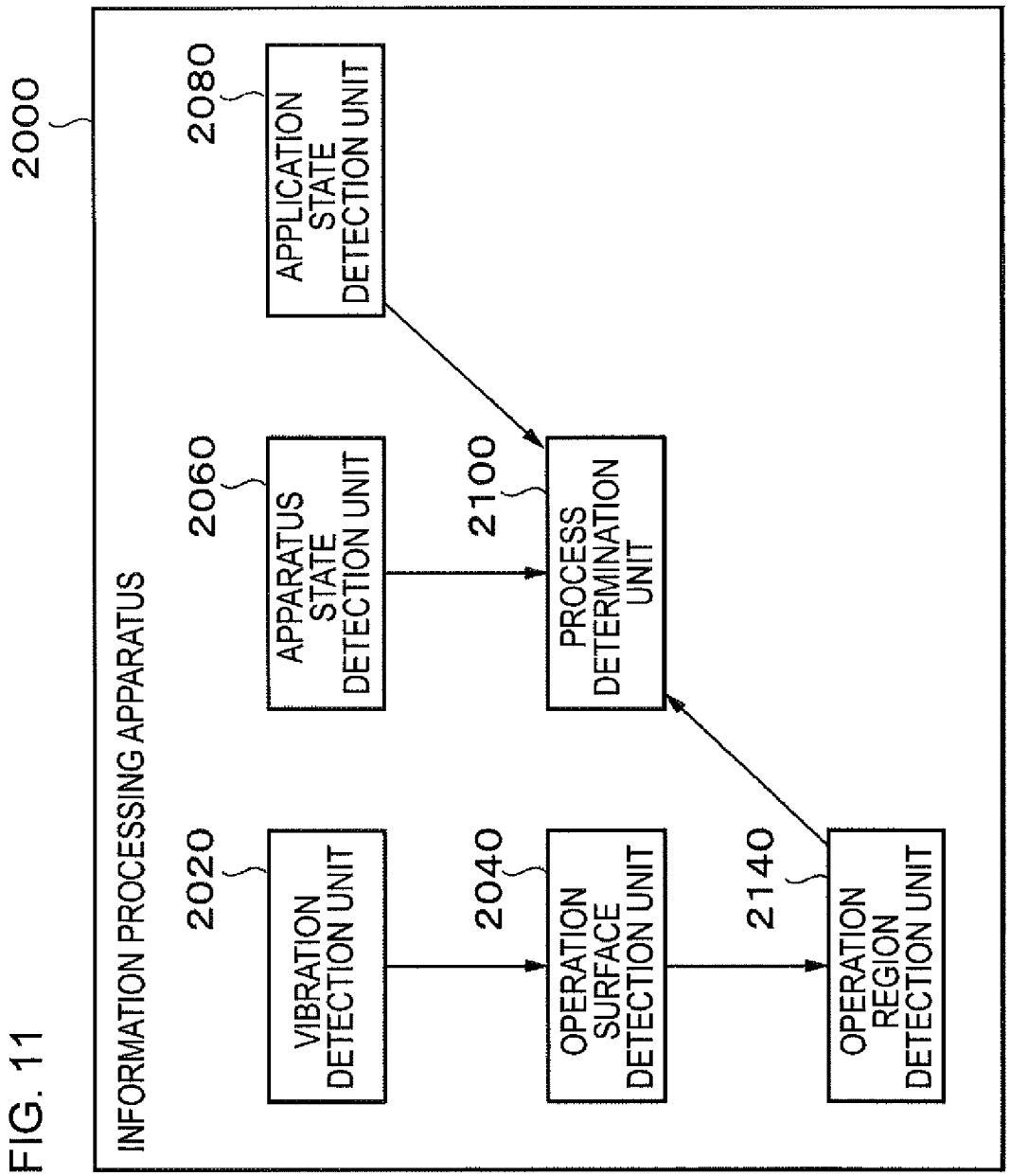
FIG. 11 is a block diagram illustrating an information processing apparatus according to Exemplary Embodiment 3.

FIG. 11 is a block diagram illustrating an information processing apparatus 2000 according to Exemplary Embodiment 3.

Each surface included in the information processing apparatus 2000 of Exemplary Embodiment 3 includes a plurality of partial regions.

<Operation Region Detection Unit 2140>

The information processing apparatus 2000 includes an operation region detection unit 2140. The operation region detection unit 2140 detects to which partial region a vibration is applied, among the plurality of partial regions included in the operation surface that the operation surface detection unit 2040 detects. Hereinafter, the partial region to which a vibration is applied among the plurality of partial regions included in the operation surface is denoted by an operation region.

Figure 12:
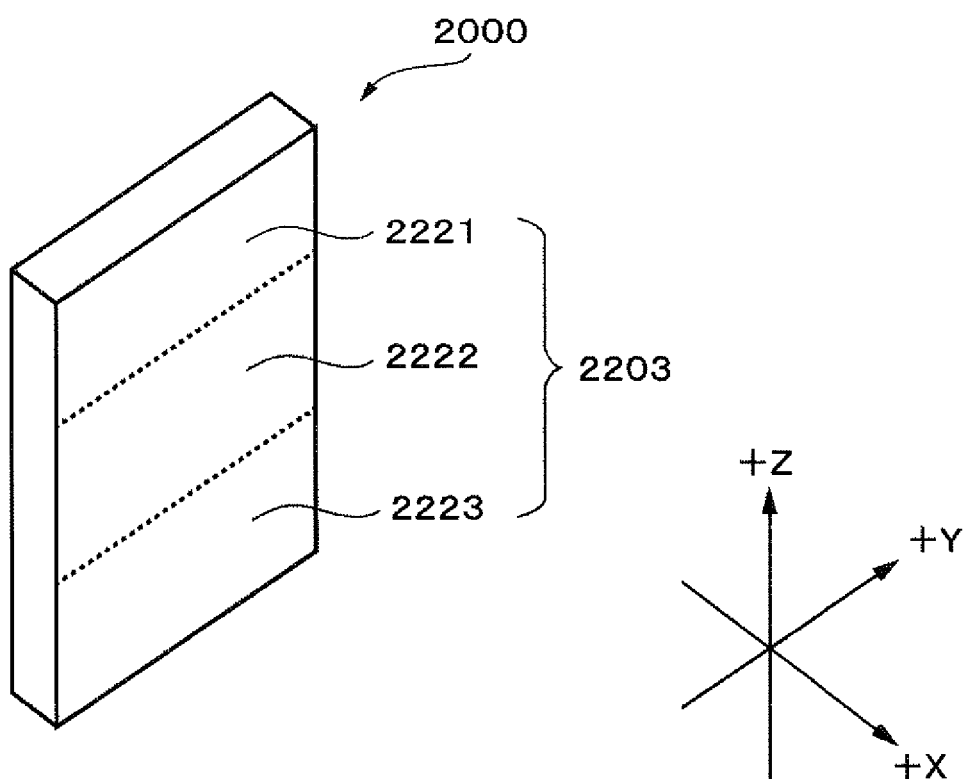
FIG. 12 is a diagram illustrating a plurality of partial regions of the information processing apparatus.

FIG. 12 is a diagram illustrating a plurality of partial regions included in the information processing apparatus 2000 of Exemplary Embodiment 3. In FIG. 12, the surface 2203 includes partial regions 2221 to 2223. After the surface 2203 is detected to be an operation surface by the operation surface detection unit 2040, the operation region detection unit 2140 detects to which partial region a vibration is applied, among the partial regions 2221 to 2223.

The operation region detection unit 2140 detects an operation region, for example, based on the direction of a vibration that the vibration detection unit 2020 detects. FIG. 13 is a diagram illustrating a difference in vibration direction due to a difference in operation region. FIG. 13(*a*) shows a case where the partial region 2223 is tapped. In the case of FIG. 13(*a*), the vibration detection unit 2020 detects a vibration in a direction away from the partial region 2223. On the other hand, FIG. 13(*b*) shows a case where the partial region 2221 is tapped. In the case of FIG. 13(*b*), the vibration detection unit 2020 detects a vibration in a direction away from the partial region 2221. In this manner, when the tapped partial region is different, the direction of the vibration detected by the vibration detection unit 2020 is different. Thus, the operation region detection unit 2140 can detect an operation region based on the operation surface detected by the operation surface detection unit 2040 and the direction of the vibration detected by the vibration detection unit 2020.

<Flow of Processes>

Figure 14:
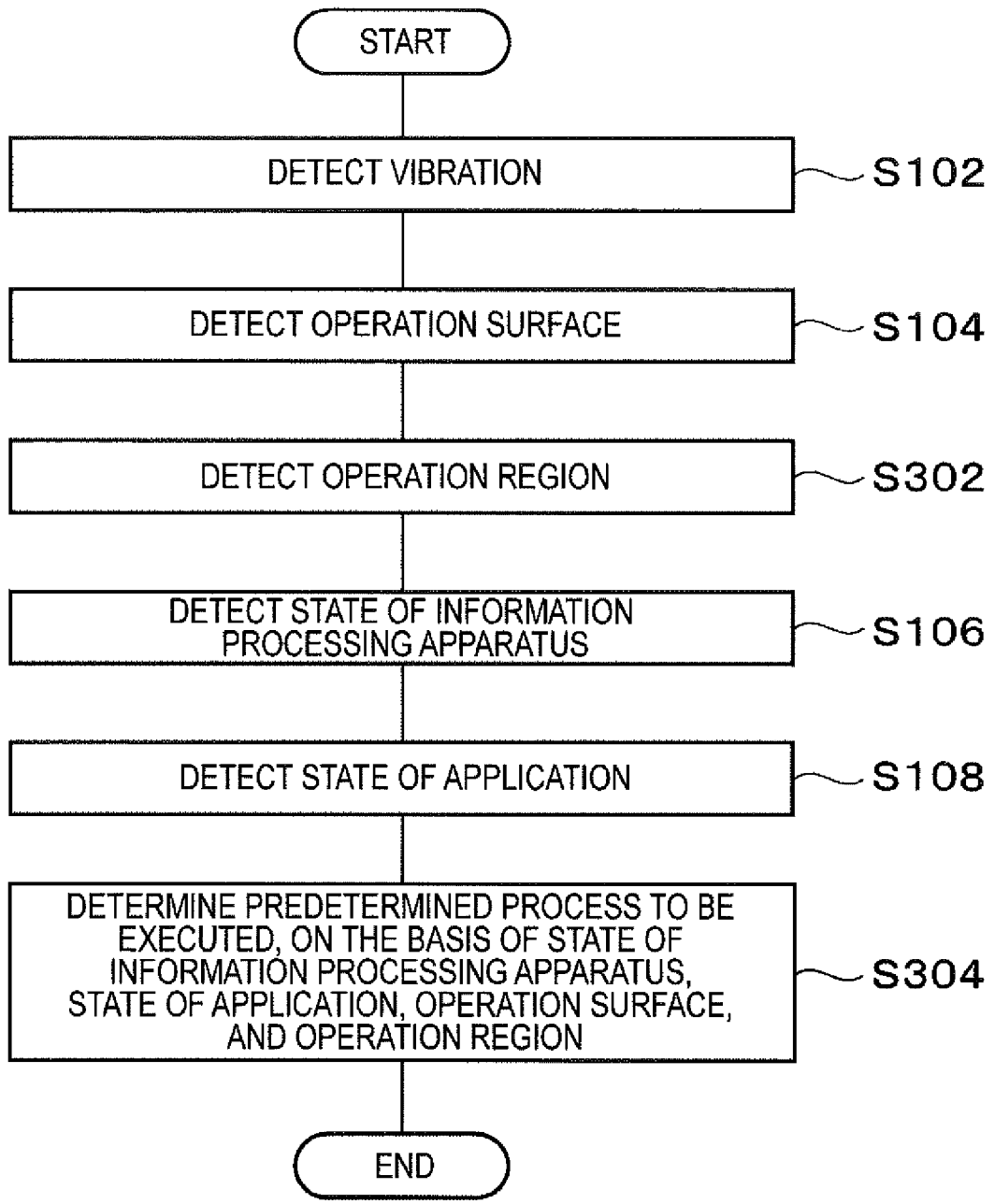
FIG. 14 is a flow diagram illustrating a flow of processes performed by the information processing apparatus according to Exemplary Embodiment 3.

FIG. 14 is a flow diagram illustrating a flow of processes executed by the information processing apparatus 2000 according to Exemplary Embodiment 3. In FIG. 14, processes of steps S102 to S108 are the same as the processes shown in the flow diagram of FIG. 5.

In step S302, the operation region detection unit 2140 detects an operation region. In step S304, the process determination unit 2100 determines a predetermined process to be executed, based on the state of the information processing apparatus, the state of the application, the operation surface, and the operation region.

<Operational Effect>

According to the information processing apparatus 2000 of Exemplary Embodiment 3, a predetermined process executed by the information processing apparatus 2000 is determined from a plurality of predetermined processes, in further consideration of the operation region, in addition to the state of the information processing apparatus 2000, the state of the application, and the operation surface. Therefore, according to the information processing apparatus 2000 of Exemplary Embodiment 3, it is possible to provide a greater diversity of operation methods than those in the information processing apparatus 2000 of Exemplary Embodiment 1.

As described above, although the exemplary embodiments of the present invention have been set forth with reference to the accompanying drawings, these exemplary embodiments are merely illustrative of the present invention, and a combination of the above exemplary embodiments and various configurations other than those in the above-mentioned exemplary embodiments can also be adopted. For example, Exemplary Embodiment 2 and Exemplary Embodiment 3 may be combined, and thus the information processing apparatus 2000 that determines a process to be executed is obtained based on the state of the information processing apparatus 2000, the state of the application, the operation surface, the operation region, and the vibration number.

Hereinafter, examples of reference forms are appended.

1. An information processing apparatus having a plurality of surfaces and executing an application, including:
a vibration detection unit detecting a vibration which is applied to the information processing apparatus;
an operation surface detection unit detecting an operation surface among the plurality of surfaces based on the vibration detected by the vibration detection unit, the operation surface being a surface to which a vibration is applied;
an apparatus state detection unit detecting a state of the information processing apparatus;
an application state detection unit detecting a state of the application; and
a process determination unit determining a predetermined process to be executed, from a plurality of predetermined processes, based on the state of the application, the state of the information processing apparatus, and the operation surface.

2. The information processing apparatus according to 1, wherein the state of the information processing apparatus that the apparatus state detection unit detects is a posture of the information processing apparatus or a location of the information processing apparatus.

3. The information processing apparatus according to 1 or 2, further including a vibration number detection unit detecting the number of vibrations based on the vibration detected by the vibration detection unit, the number of vibrations being the number of times a vibration is applied to the information processing apparatus,
wherein the process determination unit determines the predetermined process, further using the number of vibrations.

4. The information processing apparatus according to any one of 1 to 3, wherein the surface of the information processing apparatus has a plurality of partial regions, the information processing apparatus includes an operation region detection unit detecting an operation region from a plurality of partial regions included in the operation surface detected by the operation surface detection unit, the operation region being a partial region to which a vibration is applied,
wherein the process determination unit determines the predetermined process, further using the operation region.

5. The information processing apparatus according to any one of 1 to 4, wherein the predetermined process includes a process of starting an operation of the application, a process of terminating the operation of the application, a process of stopping the operation of the application, or a process of restarting the operation of the application.

6. The information processing apparatus according to any one of 1 to 5, wherein the predetermined process includes a process of changing contents to be processed by the application or a process of changing a processing position of contents processed by the application.

7. The information processing apparatus according to any one of 1 to 6, wherein the predetermined process includes: a process of increasing a volume of sound to be output; a process of reducing a volume of sound to be output; a process of increasing a volume of sound to be acquired; a process of reducing the volume of sound to be acquired; a process of enabling a sound output; a process of disabling a sound output; a process of enabling sound acquisition; or a process of disabling sound acquisition.

8. The information processing apparatus according to any one of 1 to 7, wherein the predetermined process includes: a process of changing a state of a voice call from a state in which a call incoming to a state in which the call is established; a process of changing the state of a voice call from a state in which a call is established to state in which the call is finished; a process of changing the state of a voice call from a state in which a call is established to a state in which the call is held; or a process of stopping output of a ring tone while maintaining the state of a voice call to a state in which a call is incoming.

9. An information processing program that controls a computer having a plurality of surfaces and executing an application, the program causing the computer to have:
a vibration detection function of detecting a vibration which is applied to the computer;
an operation surface detection function of detecting an operation surface among the plurality of surfaces based on the vibration detected by the vibration detection step, the operation surface being a surface to which a vibration is applied;
an apparatus state detection function of detecting a state of the computer;
an application state detection function of detecting a state of the application; and a process determination function of determining a predetermined process to be executed, from a plurality of predetermined processes, based on the state of the application, the state of the computer, and the operation surface.

10. The information processing program according to 9, wherein the state of the computer that the apparatus state detection function detects is a posture of the computer or a location of the computer.

11. The information processing program according to 9 or 10, causing the computer to further have a vibration number detection function of detecting the number of vibrations based on the vibration detected by the vibration detection function, the number of vibrations being the number of times a vibration is applied to the computer,
wherein the process determination function determines the predetermined process, further using the number of vibrations.

12. The information processing program according to any one of 9 to 11, wherein the surface of the computer includes a plurality of partial regions,
the information processing program causes the computer to have an operation region detection function of detecting an operation region from the plurality of partial regions included in the operation surface detected by the operation surface detection function, the operation region being a partial region to which a vibration is applied, and
the process determination function determines the predetermined process, further using the operation region.

13. The information processing program according to anyone of 9 to 12, wherein the predetermined process includes a process of starting an operation of the application, a process of terminating the operation of the application, a process of stopping the operation of the application, or a process of restarting the operation of the application.

14. The information processing program according to any one of 9 to 13, wherein the predetermined process includes a process of changing contents to be processed by the application or a process of changing a processing position of contents processed by the application.

15. The information processing program according to any one of 9 to 14, wherein the predetermined process includes: a process of increasing a volume of sound to be output; a process of reducing a volume of sound to be output; a process of increasing a volume of sound to be acquired; a process of reducing the volume of sound to be acquired; a process of enabling a sound output; a process of disabling a sound output; a process of enabling sound acquisition; or a process of disabling sound acquisition.

16. The information processing program according to any one of 9 to 15, wherein the predetermined process includes: a process of changing a state of a voice call from a state in which a call incoming to a state in which the call is established; a process of changing the state of a voice call from a state in which a call is established to state in which the call is finished; a process of changing the state of a voice call from a state in which a call is established to a state in which the call is held; or a process of stopping output of a ring tone while maintaining the state of a voice call to a state in which a call is incoming.

17. An information processing method, which is executed by a computer having a plurality of surfaces and executing an application, including:
a vibration detection step of detecting a vibration which is applied to the computer;
an operation surface detection step of detecting an operation surface among the plurality of surfaces based on the vibration detected by the vibration detection step, the operation surface being a surface to which a vibration is applied;
an apparatus state detection step of detecting a state of the computer;
an application state detection step of detecting a state of the application; and
a process determination step of determining a predetermined process to be executed, from a plurality of predetermined processes, based on the state of the application, the state of the computer, and the operation surface.

18. The information processing method according to 17, wherein the state of the computer that the apparatus state detection step detects is a posture of the computer or a location of the computer.

19. The information processing method according to 17 or 18, further including a vibration number detection step of detecting the number of vibrations based on the vibration detected in the vibration detection step, the number of vibrations being the number of times a vibration is applied to the computer,
wherein in the process determination step, the predetermined process is determined further using the number of vibrations.

20. The information processing method according to any one of 17 to 19, wherein the surface of the computer includes a plurality of partial regions,
the information processing method includes an operation region detection step of detecting an operation region from the plurality of partial regions included in the operation surface detected by the operation surface detection step, the operation region being a partial region to which a vibration is applied, and
in the process determination step, the predetermined process is determined further using the operation region.

21. The information processing method according to any one of 17 to 20, wherein the predetermined process includes a process of starting an operation of the application, a process of terminating the operation of the application, a process of stopping the operation of the application, or a process of restarting the operation of the application.

22. The information processing method according to any one of 17 to 21, wherein the predetermined process includes a process of changing contents to be processed by the application or a process of changing a processing position of contents processed by the application.

23. The information processing method according to any one of 17 to 22, wherein the predetermined process includes: a process of increasing a volume of sound to be output; a process of reducing a volume of sound to be output; a process of increasing a volume of sound to be acquired; a process of reducing the volume of sound to be acquired; a process of enabling a sound output; a process of disabling a sound output; a process of enabling sound acquisition; or a process of disabling sound acquisition.

24. The information processing method according to any one of 17 to 23, wherein the predetermined process includes: a process of changing a state of a voice call from a state in which a call incoming to a state in which the call is established; a process of changing the state of a voice call from a state in which a call is established to state in which the call is finished; a process of changing the state of a voice call from a state in which a call is established to a state in which the call is held; or a process of stopping output of a ring tone while maintaining the state of a voice call to a state in which a call is incoming.

The application claims priority from Japanese Patent Application No. 2013-025901 filed on Feb. 13, 2013, the content of which is incorporated herein by reference in its entirety.

What is claimed is:

1. An information processing apparatus having a plurality of surfaces and executing an application, including:
a vibration detection unit implemented at least by hardware and detecting a vibration which is applied to the information processing apparatus;
an operation surface detection unit implemented at least by the hardware and detecting an operation surface among the plurality of surfaces based on the vibration detected by the vibration detection unit, the operation surface being a surface to which a vibration is applied;
a photodetector;
an apparatus state detection unit implemented at least by the hardware and determining whether or not the information processing apparatus is located at a place in which light having more than a predetermined intensity is detected by the photodetector, and determining whether or not the information processing apparatus is located around a user of the information processing apparatus by determining whether or not a temperature measured by a temperature sensor is close to a body temperature of a person;
an application state detection unit implemented at least by the hardware and detecting a state of the application; and
a process determination unit implemented at least by a processor and memory and determining a predetermined process to be executed from a plurality of predetermined processes, based on a combination of: the state of the application; a result of the determination of whether or not the information processing apparatus is located at a place in which light having more than the predetermined intensity; a result of the determination of whether or not the information processing apparatus is located around the user of the information processing apparatus; and the operation surface,
wherein when it is determined that the state of the application is during incoming call and the information processing apparatus is located at a position which is around the user of the information processing apparatus and at which light having more than the predetermined intensity is detected, a process of responding to an incoming call in a normal call mode is determined as the predetermined process to be executed, when it is determined that the state of the application is during incoming call and the information processing apparatus is located at a position which is not around the user of the information processing apparatus and at which light having more than the predetermined intensity is detected, a process of responding to the incoming call in a hands-free call mode is determined as the predetermined process to be executed, when it is determined that the state of the application is during incoming call and the information processing apparatus is located at a position which is around the user of the information processing apparatus and at which light having more than the predetermined intensity is not detected, a process of responding to the incoming call in the hands-free call mode is determined as the predetermined process to be executed, when it is determined that the state of the application is during incoming call and the information processing apparatus is located at a position which is not around the user of the information processing apparatus and at which light having more than the predetermined intensity is not detected, a process of executing an answering machine function is determined as the predetermined process to be executed.

2. The information processing apparatus according to claim 1, further including a vibration number detection unit implemented at least by the hardware and detecting the number of vibrations based on the vibration detected by the vibration detection unit, the number of vibrations being the number of times a vibration is applied to the information processing apparatus, wherein the process determination unit determines the predetermined process, further using the number of vibrations.

3. The information processing apparatus according to claim 1, wherein the surface of the information processing apparatus has a plurality of partial regions, the information processing apparatus includes an operation region detection unit detecting an operation region from a plurality of partial regions included in the operation surface detected by the operation surface detection unit, the operation region being a partial region to which a vibration is applied.

4. The information processing apparatus according to claim 1, wherein the predetermined process includes a process of starting an operation of the application, a process of terminating the operation of the application, a process of stopping the operation of the application, or a process of restarting the operation of the application.

5. The information processing apparatus according to claim 1, wherein the predetermined process includes a process of changing contents to be processed by the application or a process of changing a processing position of contents processed by the application.

6. The information processing apparatus according to claim 1, wherein the predetermined process includes: a process of increasing a volume of sound to be output; a process of reducing a volume of sound to be output; a process of increasing a volume of sound to be acquired; a process of reducing the volume of sound to be acquired; a process of enabling a sound output; a process of disabling a sound output; a process of enabling sound acquisition; or a process of disabling sound acquisition.

7. The information processing apparatus according to claim 1, wherein the predetermined process includes: a process of changing a state of a voice call from a state in which a call is incoming to a state in which the call is established; a process of changing the state of a voice call from a state in which a call is established to state in which the call is finished; a process of changing the state of a voice call from a state in which a call is established to a state in which the call is held; or a process of stopping output of a ring tone while maintaining the state of a voice call to a state in which a call is incoming.

8. A method comprising:

detecting a vibration applied to an information processing apparatus;

detecting an operation surface among a plurality of surfaces based on the detected vibration, the operation surface being a surface to which the vibration is applied;

detecting light by a photodetector;

determining whether or not the information processing apparatus is located at a place in which the light having more than a predetermined intensity is detected by the photodetector;

determining whether or not the information processing apparatus is located around a user of the information processing apparatus by determining whether or not a temperature measured by a temperature sensor is close to a body temperature of a person;

detecting a state of an application;

determining a predetermined process to be executed, from a plurality of predetermined processes, based on a combination of: the state of the application; a result of the determination of whether or not the information processing apparatus is located at a place in which light having more than the predetermined intensity; a result of the determination of whether or not the information processing apparatus is located around the user of the information processing apparatus; and the operation surface, wherein when it is determined that the state of the application is during incoming call and the information processing apparatus is located at a position which is around the user of the information processing apparatus and at which light having more than the predetermined intensity is detected, a process of responding to an incoming call in a normal call mode is determined as the predetermined process to be executed, when it is determined that the state of the application is during incoming call and the information processing apparatus is located at a position which is not around the user of the information processing apparatus and at which light having more than the predetermined intensity is detected, a process of responding to the incoming call in a hands-free call mode is determined as the predetermined process to be executed, when it is determined that the state of the application is during incoming call and the information processing apparatus is located at a position which is around the user of the information processing apparatus and at which light having more than the predetermined intensity is not detected, a process of responding to the incoming call in the hands-free call mode is determined as the predetermined process to be executed, when it is determined that the state of the application is during incoming call and the information processing apparatus is located at a position which is not around the user of the information processing apparatus and at which light having more than the predetermined intensity is not detected, a process of executing an answering machine function is determined as the predetermined process to be executed.

9. A non-transitory computer-readable data storage medium having computer-executable code that a computing device executes to perform a method comprising:
    causing a vibration applied to an information processing apparatus to be detected;
    causing an operation surface among a plurality of surfaces to be detected based on the detected vibration, the operation surface being a surface to which the vibration is applied;
    causing light to be detected by a photodetector;
    determining whether or not the information processing apparatus is located at a place in which the light having more than a predetermined intensity is detected by the photodetector;
    determining whether or not the information processing apparatus is located around a user of the information processing apparatus by determining whether or not a temperature measured by a temperature sensor is close to a body temperature of a person;
    detecting a state of an application;
    determining a predetermined process to be executed, from a plurality of predetermined processes, based on a combination of: the state of the application; a result of the determination of whether or not the information processing apparatus is located at a place in which light having more than the predetermined intensity; a result of the determination of whether or not the information processing apparatus is located around the user of the information processing apparatus; and the operation surface, wherein when it is determined that the state of the application is during incoming call and the information processing apparatus is located at a position which is around the user of the information processing apparatus and at which light having more than the predetermined intensity is detected, a process of responding to an incoming call in a normal call mode is determined as the predetermined process to be executed, when it is determined that the state of the application is during incoming call and the information processing apparatus is located at a position which is not around the user of the information processing apparatus and at which light having more than the predetermined intensity is detected, a process of responding to the incoming call in a hands-free call mode is determined as the predetermined process to be executed, when it is determined that the state of the application is during incoming call and the information processing apparatus is located at a position which is around the user of the information processing apparatus and at which light having more than the predetermined intensity is not detected, a process of responding to the incoming call in the hands-free call mode is determined as the predetermined process to be executed, when it is determined that the state of the application is during incoming call and the information processing apparatus is located at a position which is not around the user of the information processing apparatus and at which light having more than the predetermined intensity is not detected, a process of executing an answering machine function is determined as the predetermined process to be executed.

* * * * *